United States Patent [19]
Yoshioka et al.

[11] Patent Number: 5,918,215
[45] Date of Patent: Jun. 29, 1999

[54] CONTENT SALES PRICE ACCOUNTING SYSTEM AND ACCOUNTING METHOD THEREOF

[75] Inventors: Makoto Yoshioka; Haruhiko Tsunoda; Kazuharu Hasegawa; Hidefumi Aoe, all of Kawasaki, Japan

[73] Assignee: Fujitsu Limited, Kawasaki, Japan

[21] Appl. No.: 08/642,283

[22] Filed: May 3, 1996

[30] Foreign Application Priority Data

Sep. 1, 1995 [JP] Japan .................................. 7-225633

[51] Int. Cl.$^6$ ........................... G06F 17/60; G06F 15/00
[52] U.S. Cl. ........................ 705/30; 705/30; 705/17; 705/4; 705/39; 380/4
[58] Field of Search .................... 705/30, 17, 4, 705/39; 380/4

[56] References Cited

U.S. PATENT DOCUMENTS

| | | | |
|---|---|---|---|
| 5,396,417 | 3/1995 | Burks et al. | 705/17 |
| 5,629,980 | 5/1997 | Stefik et al. | 380/4 |
| 5,634,012 | 5/1997 | Stefik et al. | 705/39 |
| 5,664,111 | 9/1997 | Nahan et al. | 705/27 |

*Primary Examiner*—Allen R. MacDonald
*Assistant Examiner*—Jagdish Patel
*Attorney, Agent, or Firm*—Staas & Halsey

[57] ABSTRACT

A goods master is stored with sales prices and sales effective periods of respective contents. A contract master is stored with data as to whether the sales price can be reduced. A key sales section charges a content purchaser for the sale price stored in the goods master. An updating section compares the present time with a sales effective period recorded on the goods master and reduces the sales price recorded on the goods master as far as the contract master is recorded with data indicating that the sales price can be reduced for a content with a remainder of the sales effective period being one month or less.

9 Claims, 13 Drawing Sheets

CONTENT SALES PRICE ACCOUNTING SYSTEM AND ACCOUNTING METHOD THEREOF

BACKGROUND OF THE INVENTION

1. Field of the Invention

The present invention relates to a content sales price accounting system and a content sales price accounting method in a content distribution system for selling a content by distributing an encrypted content and supplying a person desiring to purchase the content with a key for decrypting the encrypted content.

2. Description of the Related Art

With the widespread use of CD-ROM drives, a content such as a film, musical work, computer program, database, etc., in the form of software and defined as digital data is frequently distributed through a CD-ROM medium. The CD-ROM medium can be manufactured at low cost and has a large capacity exceeding 500 MB. In addition, CD-ROM drives are decreasing in price and increasing in speed. Further, the CD-ROM is comparatively lightweight and thin for its storage capacity and, therefore, can be distributed by various methods, including being interposed in a magazine for distribution or other uses.

The content of the CD-ROM is stored as digital data; therefore the content can be illegally copied and installed (the term "install" herein connotes an introduction of the content into a disk device of a personal computer). Accordingly, when distributing the content of the CD-ROM, illegal copying and installation must be prevented.

Accordingly, the following has hitherto been practiced. In distributing the content by CD-ROM, several types of trial versions of the content and an encrypted real content are recorded on the CD-ROM, and thus distributed. Only a user paying a using charge (which is a one-time payment) for the content is supplied with a key for decrypting the encrypted real content, permitting the user to use the real content. For the purpose of explanation, the phrase "supplying the key in exchange for the payment of the using charge for the content" is expressed in terms such as "selling the content", and the phrase "the using charge for the content" is termed a "sales price of the content".

In the conventional content distribution system described above, the sales price of the content is fixed at all times.

However, consider the case of, e.g., contents (such as contents for which timeliness of information is important such as in text data of a magazine or news paper, and contents with a high seasonality, such as in musical data of a Christmas song, video data of a Christmas movie and image data of a New Year's card) having an automatically limited period for which the contents are allowed to be mass-sold at considerably high prices. In such a case, an operator of the content distribution system or a content provider is inclined to desire a sales price as high as possible within the sales period thereof. Similarly, for some contents sales contracts previously prescribe limits of sales periods for which the operator of the content distribution system are allowed to sell the contents. I these cases also, the operator of the content distribution system is inclined to want the sales prices to be as possible within the permitted sale periods. Further, for a content for which that a software upgrade is scheduled at an interval of a given period, as in the case of a computer program, the sales quantity of the content may decrease drastically just before the upgrade becomes available. Hence, the operator of the content distribution system or the content provider tends to reduce the fall-off in sales quantity as much as possible by reducing the sales price.

SUMMARY OF THE INVENTION

To overcome the above-mentioned problems, a primary object of the present invention is to provide a content sales price accounting system and a content sales price accounting method capable of updating a sales price of a content in accordance with a sales period, as in the case of selling the contents over the counters at ordinary retail shops in a content distribution system for selling the contents by distributing contents in an encrypted status to purchasers and supplying the purchaser desiring to purchase the contents with keys for decrypting the encrypted contents.

To obviate the above-mentioned problems, the present invention adopts the following features.

According to one aspect of the present invention, a content sales price accounting system in a content distribution system for selling contents comprises a first data base, a timer section, a price updating section and an accounting section. The first database is stored with a sales price and a sales period that are set for each content. The timer section indicates a present time. The price updating section updates a sales price set for the content recorded on the first database to a different one if at least the present time indicated by the timer section falls within a predetermined period within the sales period recorded on the first database. The accounting section charges a person who has purchased the content for the sales price of the content that is recorded in the first database.

Herein, the content is software and may include a program, musical data and video data of a movie, etc. This content may take an analog or digital format.

The first database may be a physically single database or a physically separate database recorded with a sale price or a sales period, respectively.

The timer section may be the one capable of indicating at least a present date.

The updating section may update the sale price by detecting that a total number of sold contents is less than a predetermined number or more. With this arrangement, even if a remainder of the sales period of a content is comparatively long, a rational sales price may be reset for a content that is sluggish in quantity of sales, whereby the sales of that content can be increased.

The updating section may reduce the sale price set for the content that is recorded on said first database.

The updating section may also change the sales price at an interval of a predetermined period.

The updating section may further delete the recorded sales price set for the content from the first database if the present time indicated by the timer section is the last day of the sales period onwards, which is recorded on said first database. Though the above-mentioned sales price is the object to be updated, such a content has already been impossible of being sold, and therefore a capacity of the first database can be effectively employed by deleting the record thereof.

The following element may be added to the content sales price accounting system of the present invention. More specifically, a second database may be added thereto, for storing an item of reducible-amount-of-money as to whether the sale price set for each content can be reduced. In this case, the updating section may update the sales price on condition that the reducible-amount-of-money data stored in the second database indicates that the sales price of the content can be reduced. With the addition of this second database, a content provider, when entering into a sales contract with a system operator, is capable of making a settlement as to whether the sales price of the content as an object for contract can be reduced. It is therefore possible to prevent the content sales prices from being reduced on the contrary to an intention of the content provider.

According to another aspect of the present invention, a content sales price accounting method in a content distribution system for selling contents comprises a step of recording previously a first database with a sales price and a sales period that are set for each content. The same method also comprises a step of comparing a present time with the sale period of each content, recorded on the first database, and changing the sales price recorded on the first database for the content with the present time being within a predetermined period within the sales period, and a step of charging a content purchaser for the changed sales price.

These together with other objects and advantages which will be subsequently apparent, reside in the details of construction and operation as more fully hereinafter described and claimed, reference being had to accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention are discussed herein below with reference to the accompanying drawings.

Figure 1:
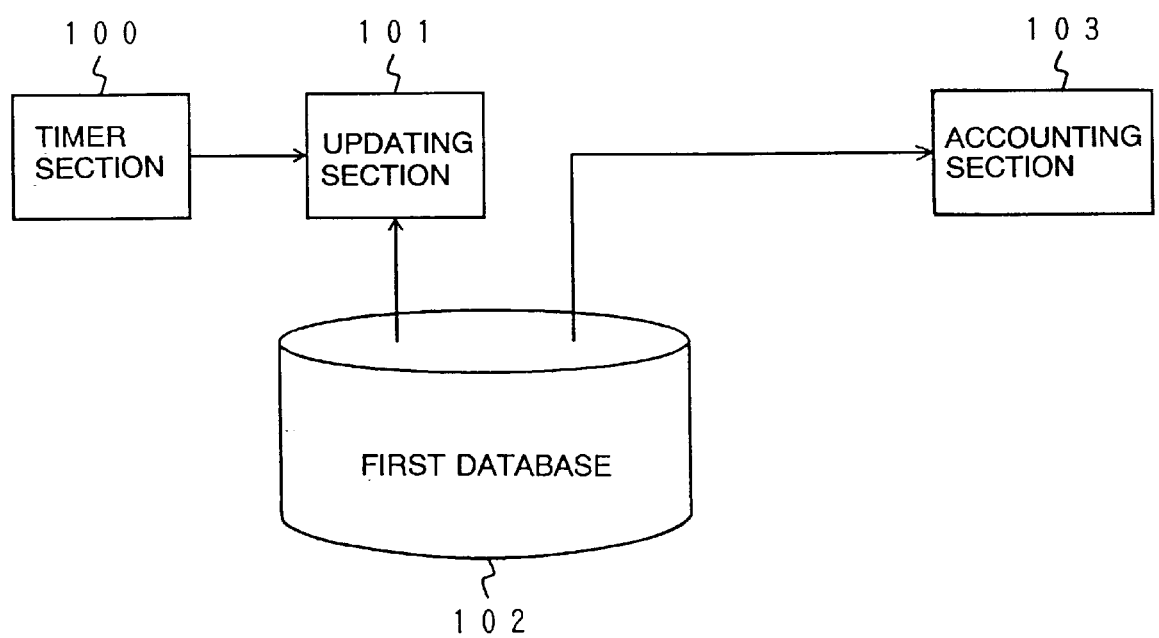
FIG. 1 is a diagram showing the principle of the first embodiment of the present invention.

FIG. 1 is a block diagram illustrating a principle of the embodiment. In the FIG. 1, the first database 102 has recorded therein the sales price and the sales period that are set for each content. The timer section indicates the present time. The updating section updates the sales price set for the concerned content that is recorded on the first database if the present time indicated by the timer section falls within the predetermined period within the sales period recorded on the first data base. The accounting section charges a person who has purchased a content for the sales price (a sales price after being updated if the updating is carried out) of the content that is recorded on the first database.

Figure 2:
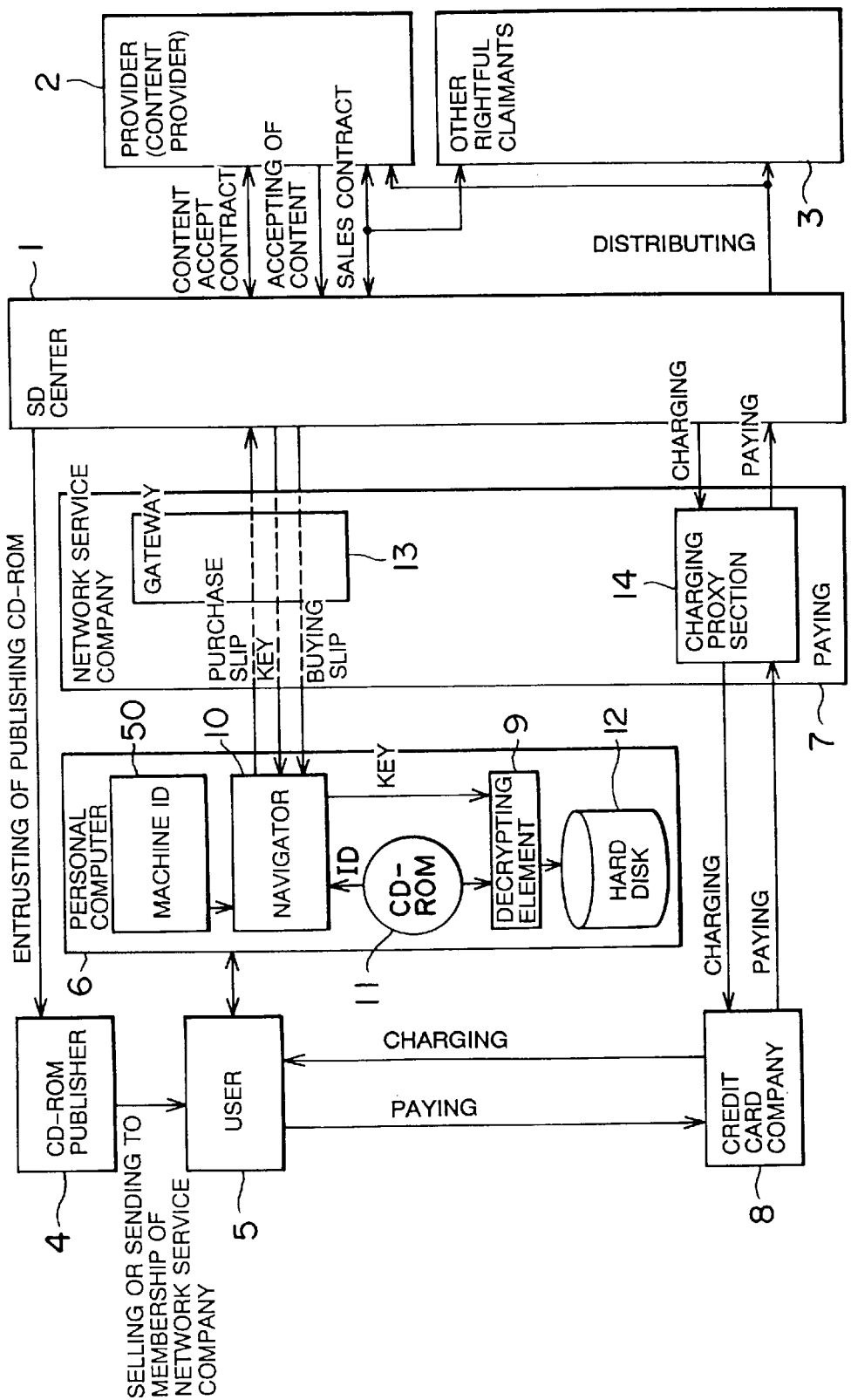
FIG. 2 is a diagram illustrating an outline of a content distribution system in a first embodiment of the present invention.

FIG. 2 is a block diagram illustrating an outline of a content distribution system of a first embodiment of the present invention. Referring to FIG. 2, an SD center 1 is equipment serving as a center of the content distribution system. An operator operating the SD center 1 may be also an enterpriser or entrepreneur of a content distribution enterprise utilizing this content distribution system. The operator in the SD center 1 enters into a content accept contract with a provider 2 for a variety of contents. The SD center 2 accepts the contents from the provider 2 on the basis of this content accept contract. Then, the operator operating the SD center 1 enters into a sales contract with respect to contents determined for sales among those accepted and distributes part of proceeds of the sold contents to the providers 2. Further, as need be, the operator of the SD center 1 enters into sales contracts with rightful claimants 3 other than the providers 2 and distributes part of the proceeds in accordance with that sales contract.

The SD center 1 encrypts and records on a single, original CD-ROM the contents of the established sales contract. Recorded also on the original CD-ROM during this editing session are a navigator (which is a software program) executing a series of processes for decrypting the encrypted contents and an installer (which is also a software program) for this navigator. The SD center 1, after performing such editing, sends a request to a CD-ROM publisher 4 to publish this CD-ROM.

The SD center 1 is connected via a gateway 13 to a network service company 7. The SD center 1 is connected via the network service company 7 and a public telephone network (which is not shown) to a personal computer 6 belonging to a user 5. The SD center 1 transmits, to the personal computer 6 of the user 5 via the network service company 7, a buying slit and a key for decrypting the content indicated on a purchase slit, in response to the purchase slit transmitted via the network service company 7 from the personal computer 6. Also, the SD center 1 issues a demand for payment of the prices of the content sold as described herein above to a charging proxy section 14 of the network service company 7. The charging proxy section 14 issues payment of the above-mentioned prices to the SD center 1, as shown in FIG. 2.

The provider 2 is normally a copyright owner (such as the author) of the content. More specifically, the provider (content provider) 2 may be a sole copyright owner or a sole creator of a certain content (a so-called primary authored work, secondary authored work, authored film work and authored editing work), all of co-copyright owners or co-creators of a certain content, and all of copyright owners or creators of respective constructive elements of an aggregative authored work. Those are direct copyright owners or creators (so-called modern authors) of the relevant contents. Unless the sales contracts with those copyright owners or creators are entered into, the SD center 1 is not allowed to sell the relevant contents. Each provider 2 has an unique ID (authoring ID).

Other rightful claimants 3 are third parties other than the providers 2 who have a right of directly charging the SD center 1 if the relevant contents are to be copied or who have an obligatory right (right of charge for running royalty, etc.) against the providers 2 if the contents are copied. A specific example of the former case are copyright owners or creators (so-called classical authors) of original authored works with respect to the secondary (or derivative) authored works and the film authored works, copyright owners or creators of authored works applied to the film authored works, performers of musical authored works and copyright owners or creators of respective constructive elements in the editing authored works. The SD center 1 is prohibited from copying the relevant contents without approval of those copyright owners and therefore must enter into sales contracts with those authors.

Another specific example of the latter case is creators who are not copyright owners but are persons entered into a running royalty payment contract with a copyright owner (provider 2 or copyright owner as applied to the former case) when transferring a right of the work. The SD center 1 is not required to enter into a sales contract with those persons and therefore has in principle no necessity for directly distributing the proceeds from the contents to those persons. In an ex post facto manner, however, the provider 2 must distribute a share distributed to the provider himself or herself to those persons in the form of a running royalty. Accordingly, if the shares of those persons are distributed directly from the SD center 1, the overhead of the provider 2 is reduced. Each of those other rightful claimants 3 has a unique ID (such as a creator ID).

The network service company 7 represents an enterpriser or entrepreneur providing network data communications such as personal computer communications but also represents a host computer thereof. The network service company 7 is, in response to a connection request received from a personal computer 6, connected via the public telephone network (which is not shown in FIG. 2) to this personal computer 6 of the user 5 registered with a membership as well as being connected to the SD center 1. Then, the network service company 7 implements a variety of data switching services between the respective personal computers 6 connected thereto and the SD center 1. The user 5 must register his or her own valid credit card number in the network service company 7 by way of a debit of service charge as a prerequisite for the registration of the membership of the network service company 7.

Further, the charging proxy section 14 of the network service company 7, in response to a charge of the content price from the SD center 1, adds an amount of money of this charge to the service using charge of the membership user 5 defined as a content purchaser. Then, the charging proxy section 14 charges a credit card company 8 offering the credit card number being registered in the network service company 7, for the service using charge to which the content price is added. When the credit card company 8 pays the service using charge in response to the above-mentioned charge, the network service company 7 deducts the primary service using charge and a predetermined fee and pays the remainder to the SD center 1.

The credit card company 8 debits the service using charge charged by the charging proxy section 14 from the user 5 (more specifically, from an account, such as a bank account, of the user 5).

The CD-ROM publisher 4 receives an entrustment for publishing the CD-ROMs form the SD center 1 and mass-produces the original CD-ROM transferred from the SD center 1. The CD-ROM publisher 4 sells the thus copied CD-ROMs 1 to the users 5 or sends the CD-ROMs to the users 5 as registered memberships of the network service company 7 free of charge.

The user 5 loads the CD-ROM 11 obtained from the CDROM publisher 4 into his or her own personal computer 6. Then, the user 5 executes an installer program stored in the CD-ROM 11. The installer program installs a navigator 10 onto a hard disk 12 of the personal computer 6 and generates a machine ID 50 by forming random numbers, etc. The installer program then writes this machine ID to the hard disk 12 of the personal computer 6. The installer program does not generate a new machine ID 50 if the machine ID 50 has already been generated in this hard disk 12.

When the navigator 10 is executed within the personal computer 6, the navigator 10 generates a decryption element 9. Then, the navigator 10, in accordance with a command input by the user 5, enables the user 5 to try out a trial version content within the CD-ROM 1 and also creates a purchase slip (text data) for purchasing the content that the user 5 desires to purchase. Also, the navigator 10 is connected to the network service company 7 by executing a communication program (which is not shown) and is further connected to the SD center 1 via the gateway 13 to transmit the created purchase slip to the SD center 1. Written into this purchase slip are a CD-ROM number (which is unique to every CD-ROM), a content ID(which is unique to every content), an access number generated from the CD-ROM number, the content ID and the machine ID, and an ID (hereinafter referred to as user ID) of the relevant user 5 that is registered in the network service company 7. When a key (for demodulating the encrypted content) encrypted by this access number is sent back from the SD center 1, the navigator 10 decrypts the key with the recorded access number and transfers the decrypted key to the decryption element 9. The decryption element 9 reads the (encrypted) content that the user 5 desires to purchase from the CD-ROM 11 and decrypts the content by use of the key and stores the decrypted content onto the hard disk 12.

Next, internal construction of the SD center 1 is described in detail with reference to FIG. 3.

Figure 3:
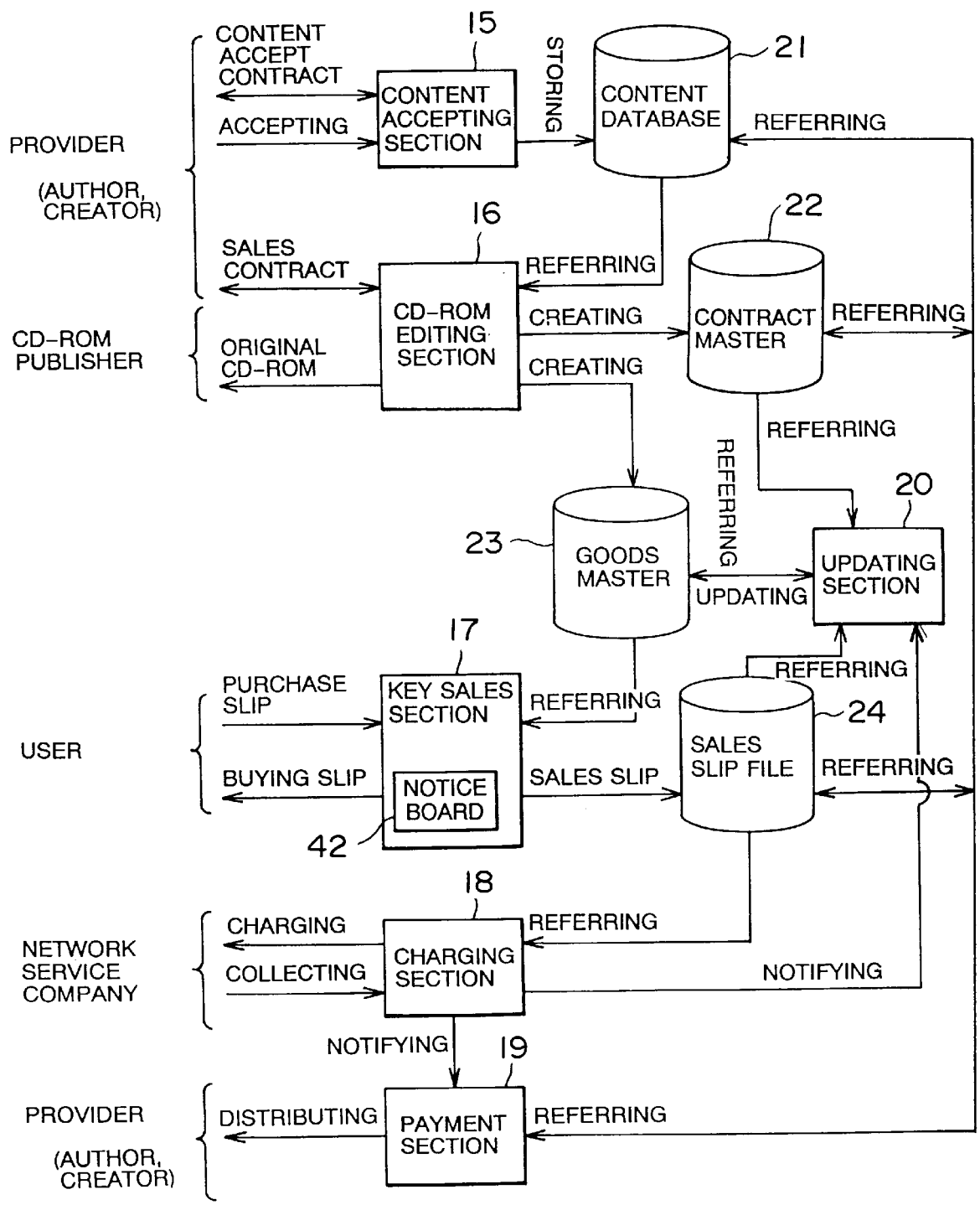
FIG. 3 is a block diagram illustrating a detailed configuration of an SD center of FIG. 2.

As shown in FIG. 3, a representative of the content accept section 15 enters into a content accept contract with the provider 2. The content accept contract provides that the SD center 1 keeps the relevant content in preparation for subsequently distributing the relevant content via a content distribution system based on the SD center 1. As a result of establishing this content accept contract, the content accept section 15 accepts the content. Then, an ID (content ID) of the accepted content is generated, and a content database 21 stores the relevant content together with this content ID. Further, the content accept section 15 stores the content database 21 with an item of provider data relative to this content. This item of provider data may be an ID (authoring ID) of the provider (author) 2 as a party concerned with the content accept contract, an ID of a party other than the provider 2 but requiring an establishment of the relevant content sales contract, and an ID of a party requiring no establishment of the content sales contract but having the right to charge for a running royalty relative to the sales of the relevant content with respect to the provider 2. The IDs of those parties are hierarchically stored in the content database 21, with the ID (authoring ID) of the provider 2 being an uppermost layer. If the shares are agreed upon between those parties, an item of data regarding the agreed shares of those parties is also stored as an item of provider data in the content database 21.

The following are specific examples of this item of provider data. A letter indicates an ID of the provider, etc., and a symbol "*" indicated that a relevant party exists, but this is not identified in each of the following examples.

Table 1 is shown as follows:

| Author | Share | Party Requiring Contract | Share | Other Creators | Share |
|---|---|---|---|---|---|
| A (Film Creator) | | B (Original Author) C (Scenario Writer) D (Painter) | | E (Film Director) | |

Table 1 is an example in which the content is a film authored work. In this case, the copyright owner (author) serving as the provider 2 is only one film creator A. However, the original author B, the scenario writer C and a painter D who depicts a picture used in the work are also the parties requiring the sales contract as so-called classical authors. Further, it is assumed that the film director E also as an author enters into a contract to receive the running royalty from the film creator A with the sales of the content. In this case, however, the above parties did not agree on the shares, and therefore the shares of the respective parties are evenly dealt with.

A second specific example is illustrated herein below.

Table 2 is shown as follows:

| Author | Share | Party Requiring Contract | Share | Other Creators | Share |
|---|---|---|---|---|---|
| F (Co-copyright owners) G (Co-copyright owners) | | | | | |

Table 2 shows an example where the content is concerned with co-authors, and the authors remain as copyright owners. In this instance also, the shares (holdings) of the respective co-copyright owners F, G are not agreed upon and are therefore evenly dealt with.

A third specific example follows.

Table 3 is shown as follows:

| Author | Share | Party Requiring Contract | Share | Other Creators | Share |
|---|---|---|---|---|---|
| F (Co-copyright owners) | 0.7 | | | | |
| G (Co-copyright owners) | 0.3 | | | | |

Table 3 shows an example in which the shares (holdings) are agreed upon between respective co-copyright owners H and I. In this case, the shares (holdings) are agreed upon. Hence, when distributing the proceeds, the co-copyright owner H receives a payment of 70% of the proceeds, while the co-copyright owner I receives a payment of 30% of the proceeds.

Table 4 shows a fourth specific example.

Table 4 is shown as follows:

| Author | Share | Party Requiring Contract | Share | Other Creators | Share |
|---|---|---|---|---|---|
| J (Representative) | | * | | | |

Table 4 is an example in which only a representative J is clearly shown, and a party in addition to the representative J require a sales contract. In this in stance, the SD center 1 recognizes only the representative J and therefore may pay the proceed s to only one representative J. The representative J has an obligation to distribute the proceeds to other rightful claimants who are not clearly indicated irrespective of a participation of the SD center 1. However, the SD center 1, when establishing the sales contract, can determine from the symbol "*" that the rightful claimants other than the representative J also are the concerned parties of the contract.

A CD-ROM editing section 16 analyzes a market and specifies contents to be written to the CD-ROM among a group of contents already stored in the content database 21. Then, a representative of the CD-ROM editing section 16 enters into a sales contract with the provider 2 and other rightful claimants (exclusive of the parties simply having only the obligatory right against the provider 2) who should be contract parties concerned. According to this sales contract, the IDs of the provider 2 and of other rightful claimants 3 as the contract parties concerned, the content ID, a sales price, a sales effective period (indicating what time to start and terminate the sale of content), a payment site (distribution rate) of the proceeds between the provider 2 and the operator of the SD center 1 and whether or not the sales price can be reduced (which is defined as an item of reducible-amount-of-money data), are agreed upon. The CD-ROM editing section 16 stores contents of this sales contract into a contract master 22 serving as a second database.

Further, the CD-ROM editing section 16 encrypts the content, about which the sales contract has been established, by use of a specified key and writes the content to the original CD-ROM. Written also to this CD-ROM are the above-mentioned CD-ROM number, the navigator (which is a program) and the installer. The CD-ROM editing section 16 entrusts the CD-ROM publisher 4 to publish the CD-ROM by transferring the thus edited original CD-ROM thereto. Further, the CD-ROM editing section 16 writes to a goods master 23 serving as a first database the CD-ROM number of this original CD-ROM, an effective period thereof and the content ID, the sales price, the sales effective period and the key of the content written to this original CD-ROM.

A key sales section 17 receives the purchase slip sent from the personal computer 6 of the user 5 and checks the CD-ROM number, the content ID and an access number that are recorded on this purchase slip by referring to the goods master 23. Then, if the effective period of the CD-ROM 11 has already terminated, if the effective sales period of the content has terminated, or if the goods master 23 includes no data corresponding to the numbers or the IDs thereof, an error message is output. In cases other than this, a corresponding key is read from the goods master 23 and encrypted with the access number, and an item of data obtained as a result of this encryption is sent in the form of a purchase number back to the personal computer 6 of the user 5. With the sending of this purchase number, the key sales section 17 imposes a charge. More specifically, the key sales section 17 reads a sales price of the content sold from the goods master 23, puts the content ID and the sales price thereof on a buying slip and sends the slip to the personal computer 6 of the user 5. The key sales section 17 also accumulates sales slips, containing the same items as the purchase slip and the user IDs of the users 5 as the purchasers, in a slip file 24.

This key sales section 17 includes a notice board 42 on which the IDs of the individual contents stored in the goods master 23, titles thereof and sales prices thereof, are copied. This notice board 42 is accessed through the navigator 10 of the personal computer 6 from the user 5.

A charging section 18 serving as an accounting section settles the number of sales per provider as well as per content with reference to a sales slip file 24 for every month and notifies an updating section 20 of a result of this settlement. Further, the charging section 18 adds up an amount of proceeds per user ID of the user 5 and charges the charging proxy section 14 of the network service company 7 for the proceeds in bulk. When the charging proxy section 14 pays the proceeds in response to this charge for the proceeds, the charging section 18 notifies a payment section 19 of this payment.

Figure 4:
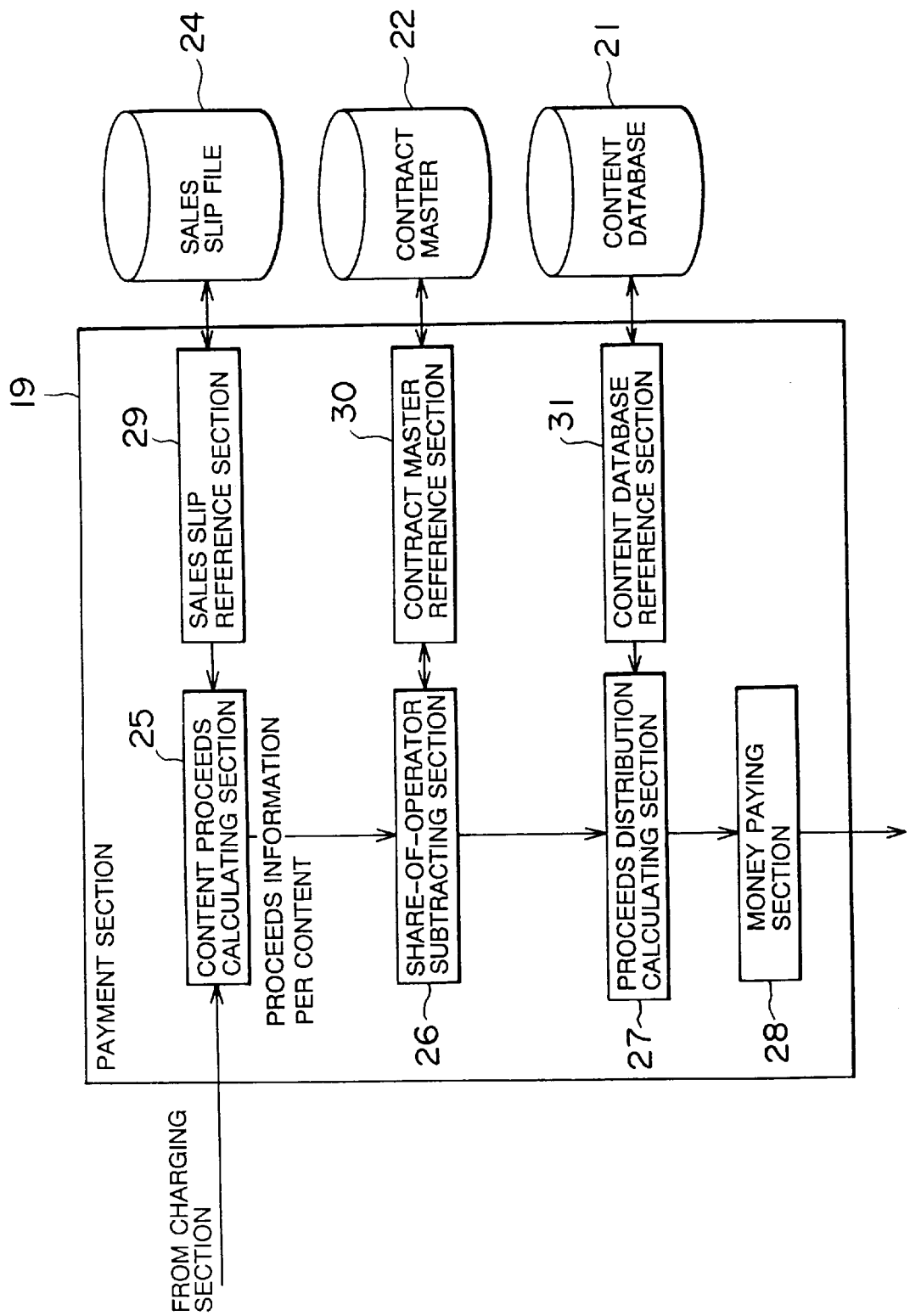
FIG. 4 is a block diagram illustrating a detailed configuration of a payment section shown in FIG. 3.

FIG. 4 illustrates an internal construction of the payment section 19. A content proceeds calculating section 25, upon receiving the notice from the charging section 18, indicates to a sales slip reference section 29 to read the sales slips accumulated in the sales slip file 24. The sales slip file 24 is defined as a recording section. The content proceeds calculating section 25, serving as a calculating section, adds up an amount of proceeds per content on the basis of the read sales slips and notifies a share-of-operator subtracting section 26 of the amount added up by the content proceeds calculating section 25.

Upon receiving a notice of the proceeds per content from the content proceeds calculating section 25, the share-of-operator subtracting section 26 indicates to a contract master reference section 30, which is defined as a first reading section, to read a payment site of each content that is stored in the contract master 22. The share-of-operator subtracting section 26 subtracts a share allocated to the operator of the SD center 1 that is determined by the payment site from the proceeds for each content and notifies a proceeds distribution calculating section 27 of a result of this substraction.

The proceeds distribution calculating section 27, upon receiving the notice of the proceeds after being subtracted from the share-of-operator subtracting section 26, indicates a content database reference section 31 to read the provider data of each content recorded in the content database 21. The proceeds distribution calculating section 27 distributes the notified proceeds to the respective providers (authors) 2, the IDs of which are recorded in the form of the provider data, and other rightful claimants 3 per content. At this time, if the provider data contains an agreement of the shares of the individual providers (authors) 2 and other rightful claimants 3, the proceeds are distributed in accordance with the agreement of the shares thereof. If not agreed upon, the proceeds are evenly distributed to the individual parties. The proceeds distribution calculating section 27 adds up the proceeds per ID (registered as the one of the provider 2 or other rightful claimant 3) and notifies a money paying section 28.

The money paying section 28 pays money of the proceeds added up per ID. More specifically, the money paying section 28 specifies bank accounts of each provider 2 and of other rightful claimant 3 on the basis of the IDs, and pays the money of proceeds added up into the specified bank accounts.

Figure 5:
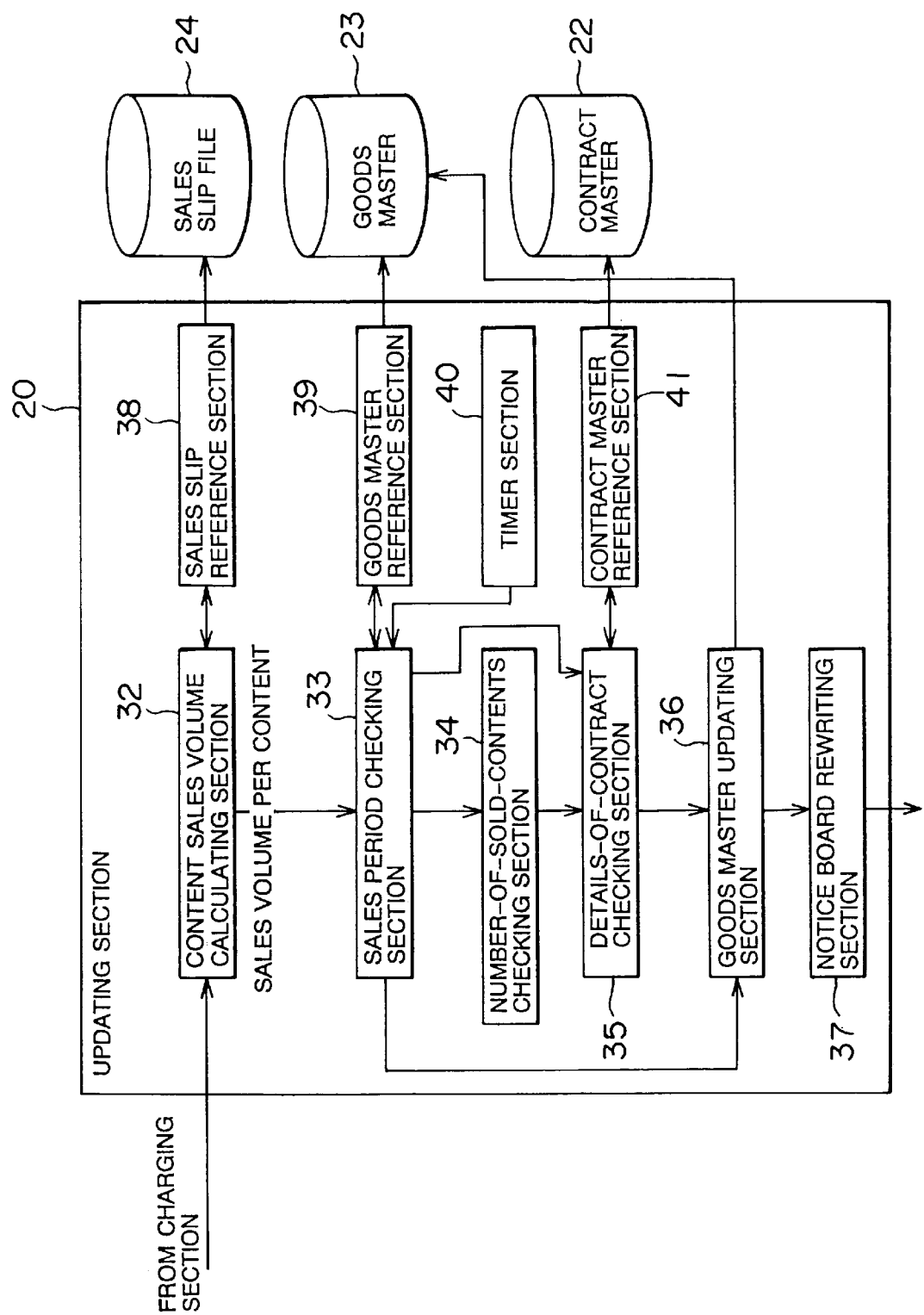
FIG. 5 is a block diagram illustrating a detailed configuration of an updating section shown in FIG. 3.

FIG. 5 illustrates an internal construction of the updating section 20. Upon receipt of a notice about the number of sales per content from the charging section 18, a content sales volume calculating section 32 of the updating section 20 indicates to a sales slip reference section 38 to read the sales price recorded on the sales slip in the sales slip file 24. The content sales volume calculating section 32 calculates a sales volume per content on the basis of the number of sales per content received from the charging section 18 and the sales prices recorded on the sales slip.

A sales period checking section 33 indicates to a goods master reference section 39 to read a sales period of each content that is recorded in the goods master 23. Also, a timer section 40 inputs an item of present date data to this sales period checking section 33. The sales period checking section 33 determines a content with the last date of the sale period that is the same as the present date and notifies the goods master updating section 36 of this content. Further, the sales period checking section 33 determines a content (such a content that the present time corresponds to a predetermined time onwards within the sales period) having one remaining month or less up to the last date of the sales period from the present date and notifies a details-of-contract checking section 35 of this content. Moreover, the sales period checking section 33 notifies a number-of-sold-contents checking section 34 of contents exclusive of that content notified to the details-of-contract checking section 35. The number-of-sold-contents checking section 34 searches for a content with a total number of sales numbering 1000 or less per month among the contents indicated by the sales period checking section on the basis of the number of sales per content that has been indicated by the charging section 18. The number-of-sold-contents checking section 34 then notifies the details-of-contract checking section 35 of this searched content.

The details-of-contract checking section 35, upon receiving the notice of the content from the sales period checking section 33 or the number-of-sold-contents checking section 34, indicates to a contract master reference section 41 to read details of contract with respect to the notified content from the contract master 22. The details-of-contract checking section 35 determines a content permitted to be reduced its sales price by the contract among the indicated contents on the basis of the read details of contract. The details-of-contract checking section 35 notifies the goods master updating section 36 of this content.

The goods master updating section 36 deletes from the goods master 23 the data concerning the contents indicated directly from the sales period checking section 33. Further, the sales prices recorded in the goods master 23 of the contents indicated by the details-of-contact checking section 35 are rewritten as lower prices. That is, the above-mentioned sales period checking section 33, the number-of-sold-contents checking section 34, the details-of-contract checking section 35 and the goods master updating section 36 correspond to an updating section.

A notice board rewriting section 37 copies respective content IDs, titles thereof and sales prices thereof with respect to all the contents recorded in the goods master 23 and overwrites them on a notice board 42 of the key sales section 17.

A flow of selling the contents through the content distribution system in this embodiment will be explained with reference to flowcharts of FIGS. 6 to 11.

Figure 6:
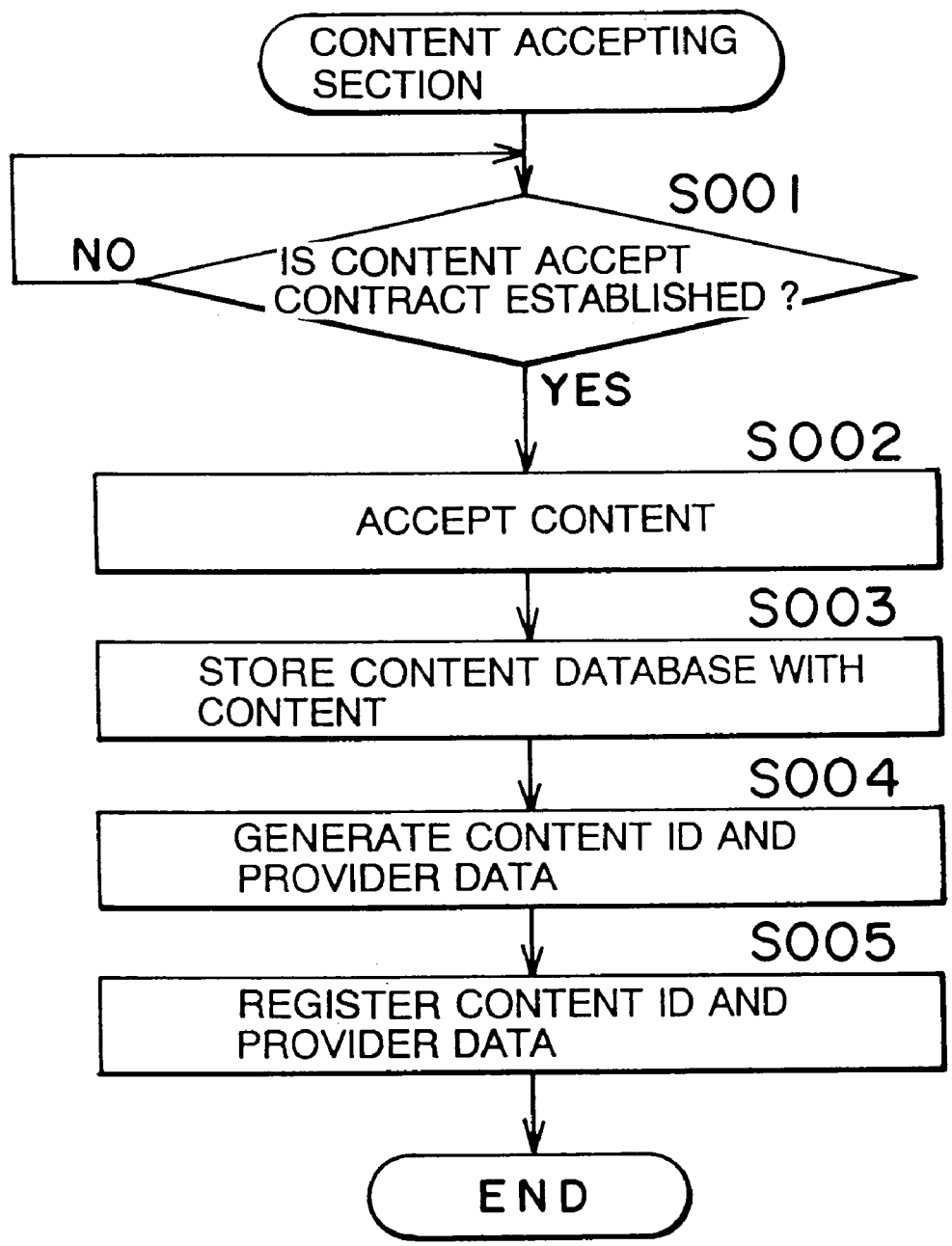
FIG. 6 is a flowchart showing processes for accepting a content that are executed by a content accepting section shown in FIG. 3.

FIG. 6 shows processes for accepting the content by a content accept section 15 of the SD center 1.

In step S001 shown in FIG. 6, the content accept section 15 checks whether or not the operator of the SD center 1 and the provider 2 have entered into a content accept contract. Then, if the content accept contract has been established, in step S002 the content is accepted via a drive device or a communication interface (neither of which are shown).

In step S003, the content accepted in step S002 is stored in the content database 21.

Generated in subsequent step S004 are a content ID labelling the content stored in the content database 21 in step S003 and above-mentioned provider data (about the authoring ID of the provider 2, the IDs of other rightful claimants 3 and the shares of those parties).

In next step S005, the content IDs and the provider data that are generated in step S004 are registered on the content database 21.

Figure 7:
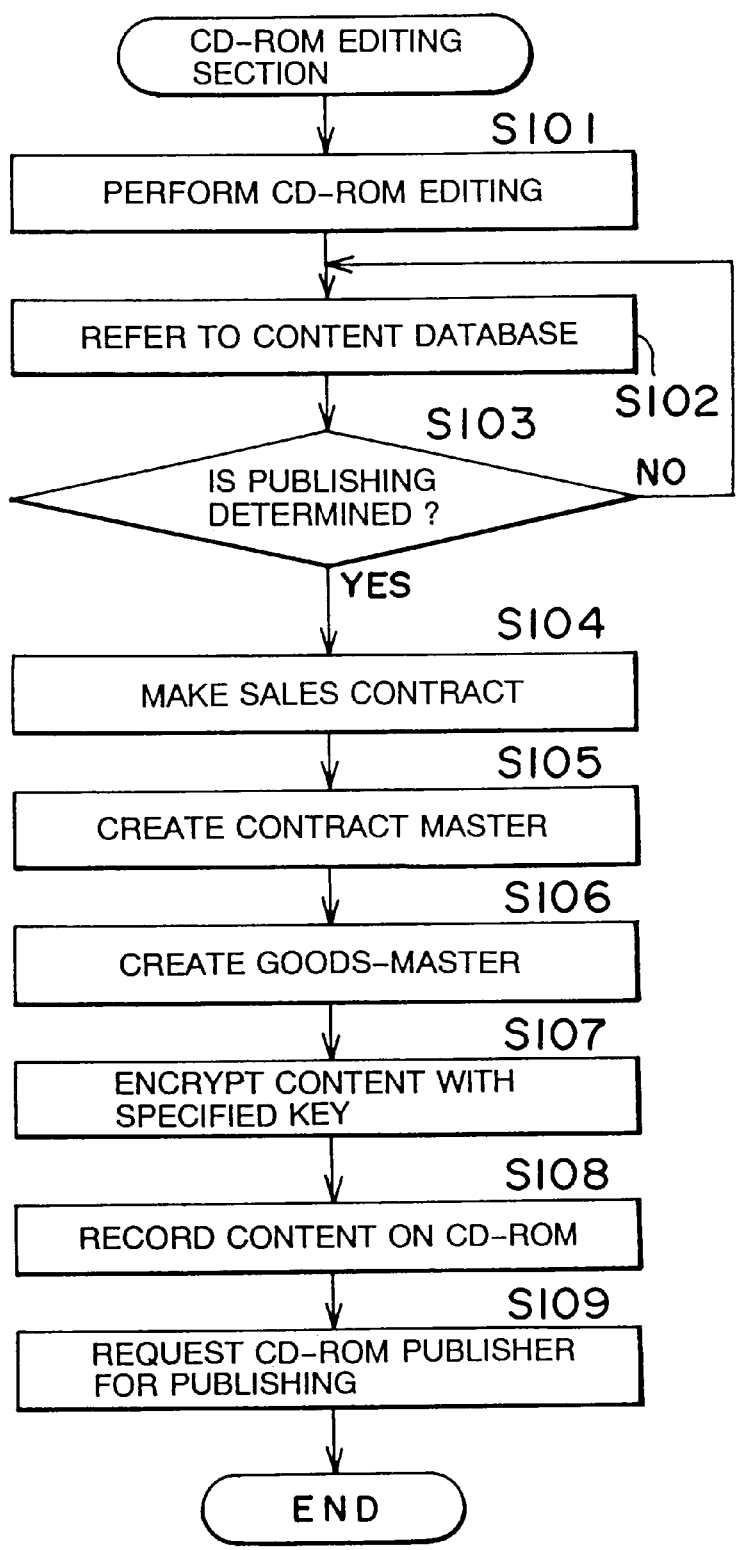
FIG. 7 is a flowchart showing CD-ROM editing processes executed by a CD-ROM editing section shown in FIG. 3.

FIG. 7 shows processes for the CD-ROM editing executed by the CD-ROM editing section 16 of the SD center 1.

In step S101 shown in FIG. 7, a CD-ROM editing operation is started in conformity with an instruction issued from the operator.

In step S102, the CD-ROM editing section 16 searches by referring to the content database 22 a good content conforming to an editing concept. In subsequent step S103, the CD-ROM editing section 16 checks whether the publishing of the content searched from the content database 22 is determined. Then, if not determined, the processing returns to step S102 to search other contents. On the other hand, if determined, the processing proceeds to step 104.

In next step S104, an establishing operation for a contract between the provider 2 (and other rightful claimant 3 concerned with the relevant content) and the representative of the CD-ROM editing section 16 to publish the content determined to be published.

In next step S105, the contract master 22 is created based on the s ales contract established in step S104.

In subsequent step S106, the goods master 23 is created from the number of the CD-ROM recorded with the relevant content, the effective period thereof, the content ID, the sales price and the sales effective period of the relevant content.

In step S107, the content with established sales contract is encrypted by a specified key. The key used for this encryption is also stored in the goods master 23.

Recorded on the original CD-ROM in step S108 are the encrypted content (which is the genuine content encrypted), a trial version content based on the genuine content but having less functions, the navigator (program), and the installer.

In next step S109, the completed original CD-ROM is sent to the CD-ROM publisher 4, and the CD-ROM editing section 16 requests the publisher 4 to publish the CD-ROM.

The CD-ROM publisher 4, in response to this publishing request, creates a multiplicity of CD-ROMs 11 based on the original CD-ROM, sells the CD-ROM 11 to the users 5 and sends the CD-ROMs 11 to the membership users 5 registered in the network service company 7. Then, the user 5 acquiring this CD-ROM 11 loads the CD-ROM 11 into the personal computer 6 and executes the installer within the CD-ROM 11. Hereupon, the navigator (program) 10 is installed into the hard disk 12, and the machine ID unique for each individual personal computer 6 is generated and then written to the hard disk 12.

Figure 8:
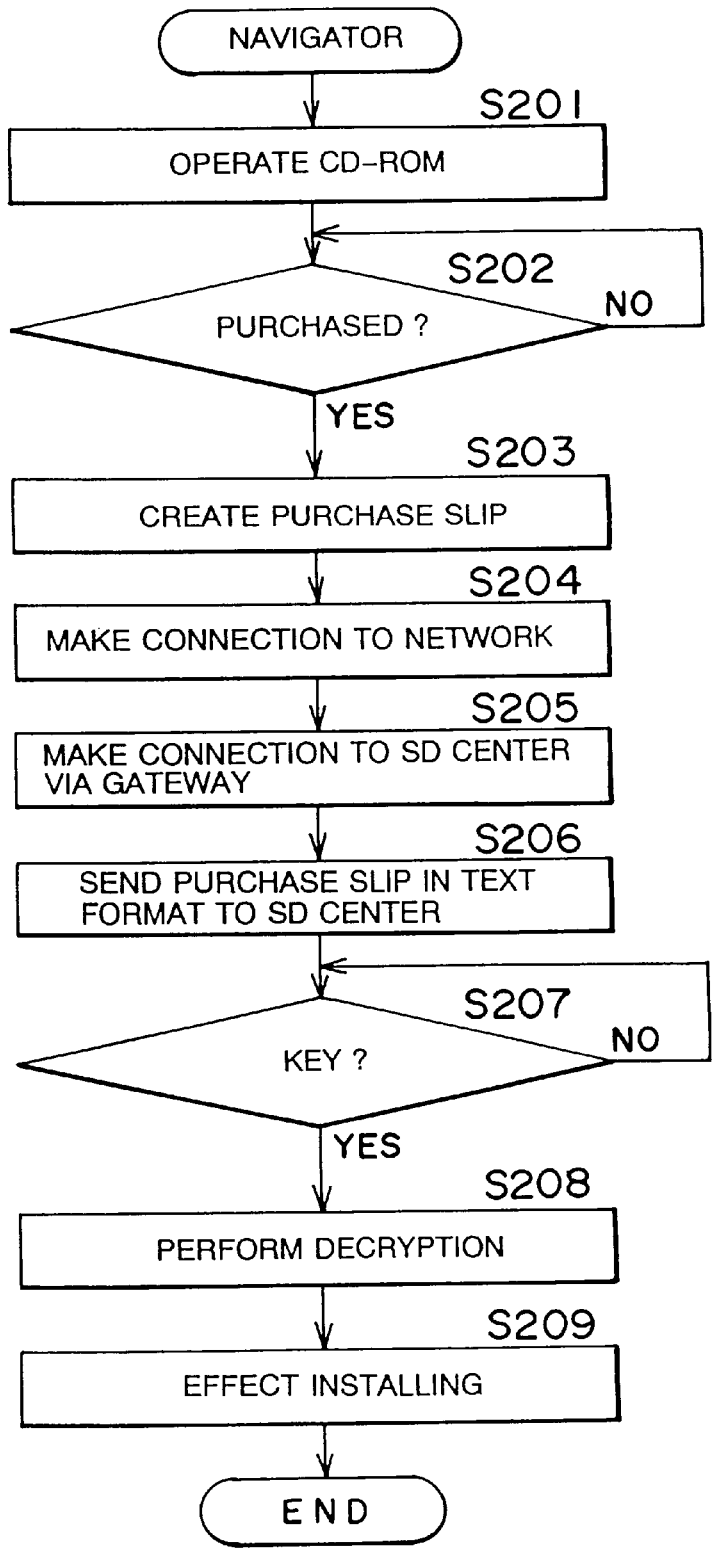
FIG. 8 is a flowchart showing processes for purchasing the content that are executed by a navigator shown in FIG. 2.

FIG. 8 shows content purchasing processes executed by the navigator 10 installed into the personal computer 6.

In step S201 shown in FIG. 8, in response to an operation from the user 5, the navigator 10 operates the CD-ROM 11. Displayed on the screen is, for example, a menu such as a purchase accept menu stored in the CD-ROM 11. In addition, the trial version content is set in a trial status.

In S202, the navigator 10 waits till the user 5 determines which content to purchase.

Step S203 is executed if purchase of the content of the CD-ROM is determined. In step S203, the access number is generated based on the content ID of the content determined to be purchased as well as on the CD-ROM number of the CD-ROM 11. Then, a purchase slip in a text data format is created based on the CD-ROM number, the content ID, the access number and the user ID of the relevant user 5. A memory (which is not shown) stores the thus generated access number.

In step S204, a communication program (which is not shown) is started up, and the personal computer 6 is connected to the network service company 7 via the public telephone network.

In subsequent step S205, the personal computer 6 is connected via the gateway 13 to the key sales section 17 of the SD center 1.

In step S206, the purchase slip created in step S203 as a file in the text format is transmitted to the key sales section 17.

In step S207, the navigator 10 waits for the key (purchase number) being transmitted from the key sales section 17 in accordance with this purchase slip.

In subsequent step S208, the purchase number transmitted from the key sales section 17 is demodulated based on the access number held in the memory (not shown), thus the key taken out. Then, the encrypted content the user 5 decided to purchase is decrypted by use of this key.

In step S209, the thus decrypted content is installed into the hard disk 12. With the above, the processes by this navigator 10 terminate.

Figure 9:
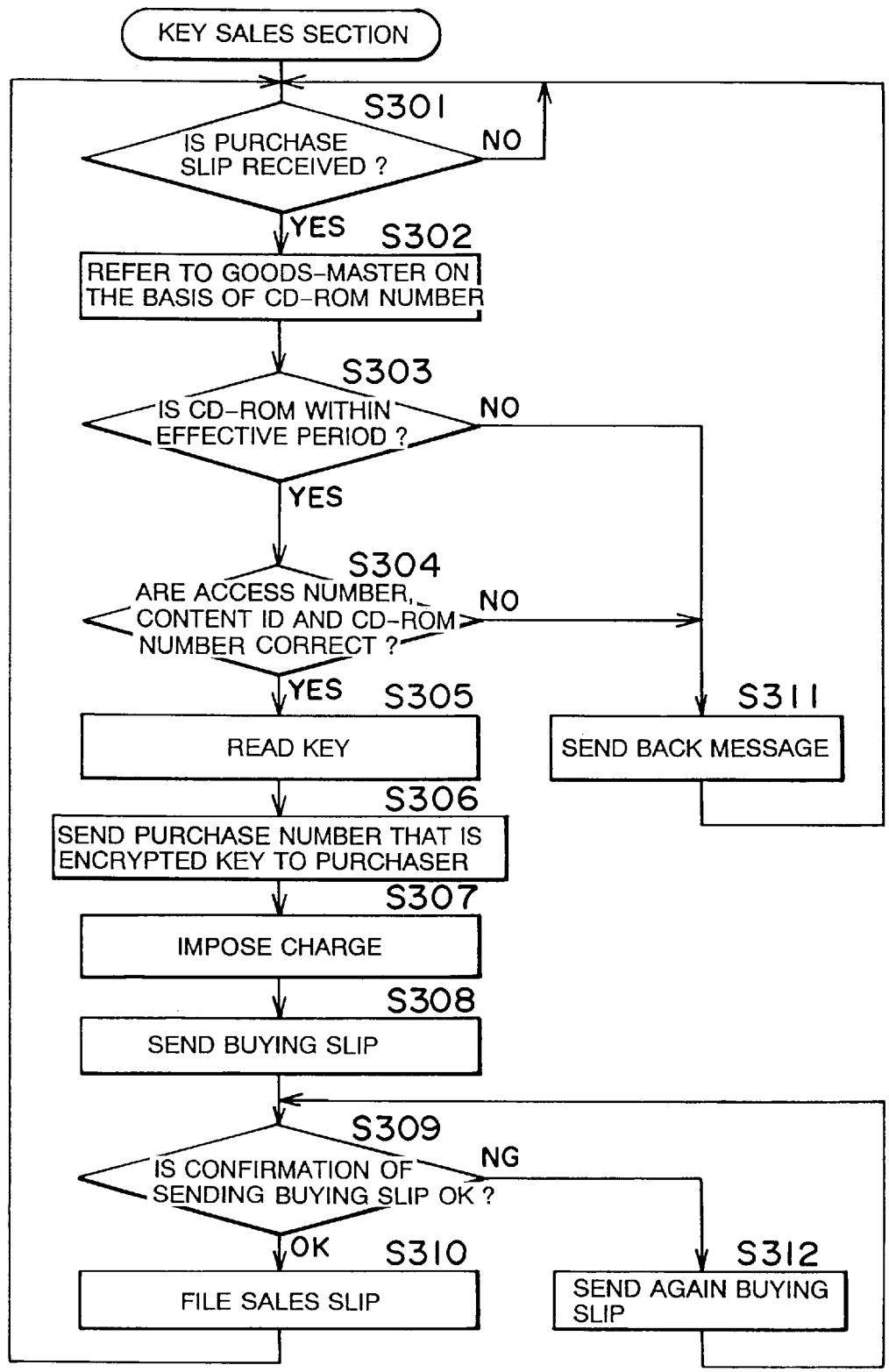
FIG. 9 is a flowchart showing processes for selling a key that are executed by a key selling section shown in FIG. 3.

FIG. 9 shows processes for selling the content, which are executed by the key sales section 17 of the SD center 1.

In step S301 shown in FIG. 9, the key sales section 17 waits for receipt of the purchase slip from the user 5. In step S302, executed when the purchase slip is received, the goods master 23 is referred to based on the CD-ROM number recorded on the purchase slip.

In subsequent step S303, the key sales section 17 checks whether the CD-ROM corresponding to the CD-ROM number recorded on the purchase slip falls at present within the effective period or not on the basis of the effective period of the CD-ROM registered in the goods master 23 referred to in step S302. If not within the effective period at present, in step S311 a message conveying that a deadline for the effective period is reached is set to the personal computer 6 of the user 5. The processing returns to step S301 in order to wait for a next purchase slip.

In step S304, executed when falling at present within the CD-ROM effective period, the key sales section 17 checks whether the CD-ROM number and the content ID that are recorded on the purchase slip are identical with those registered in the goods master 23, on the basis of this goods master 23 referred to in step S302, and whether the access number recorded on the purchase slip is logically correct. Then, if the CD-ROM number and the content ID that are recorded on the purchase slip are not identical with those registered in the goods master 23, or if the access number is not logically correct, in step S311, a message same is sent back to the personal computer 6 of the user 5 and the processing returns to step S301 to wait for a next purchase slip. The content ID of the content exceeding the sales period is, as discussed herein above, deleted from the goods master 23 by the updating section 20. Hence, if such a content ID is recorded on the purchase slip, this slip is eliminated in this step.

On the other hand, if the CD-ROM number, the content ID and the access number are all correct, in step S305, the key (used for encrypting the content corresponding to the content ID) is read from the goods master 23.

In step S306, the key read in step S305 is encrypted by the access number and transmitted back to the personal computer 6 of the user 5.

In subsequent step S307, an accounting process is implemented. As discussed herein above, the buying slip and the sales slip are made.

In step S308, the buying slip made in step S307 is sent to the personal computer 6 of the user 5.

In subsequent step S309, the key sales section 17 confirms whether the buying slip was transmitted correctly in step S308. Then, if not transmitted correctly, the buying slip is again transmitted in step S312, and the processing returns to step S309.

If the buying slip was transmitted correctly, step S310 is executed. In step S310, the sales slip made in step S307 is filed in the sales slip file 24. With the above, the processes for one sheet of purchase slip are ended, and, therefore, the processing returns to step S301 to wait for a next purchase slip.

Figure 10:
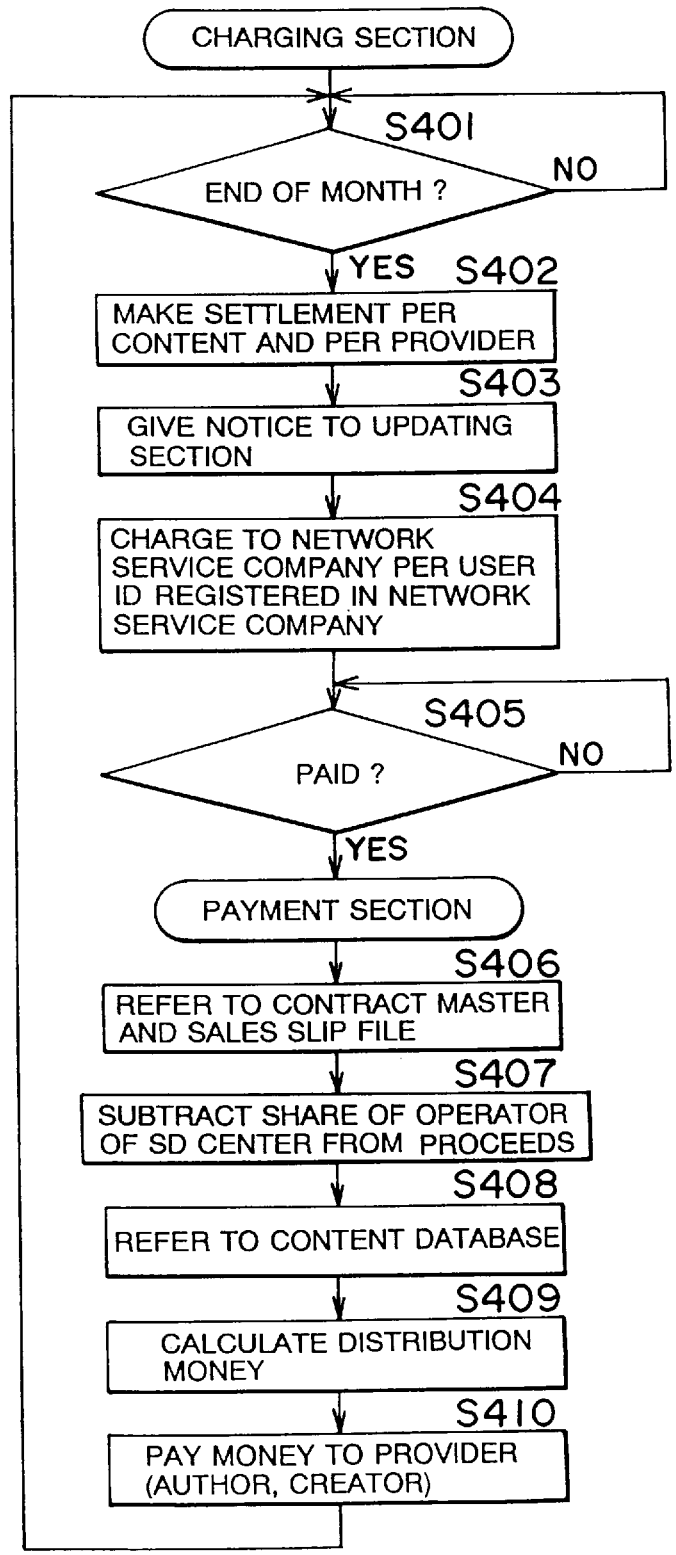
FIG. 10 is a flowchart showing charging processes executed by a charging section and paying processes executed by a payment section shown in FIG. 3.

FIG. 10 shows charging processes executed by the charging section 18 of the SD center 1 and paying processes executed by the payment section 19.

In step S401 shown in FIG. 10, the charging section 10 checks whether the present date is the end of month or not and waits till the end of month arrives. Then, when the present date arrives at the end of month, in step S402 all the sales slips accumulated in the sales slip file 24 are read, and the number of sales slips is settled per content and per provider 2.

In next step S403, the updating section 20 is notified of the number of sales slips per content.

In subsequent step S404, the read sales slips are assembled per user ID registered in the network service company 7, and the amount of proceeds is added up per user ID. Subsequently, the charging section 17 charges the network service company 7 for the added-up amount of proceeds per user ID. Upon receiving this charge, the charging proxy section 14 of the network service company 7 adds this content price to the service using charge of each user 5 and demands payment of this added amount of money from the credit card company 8. The credit card company 8, upon receiving the demand, draws this amount of money from the bank account of each user 5 and pays it to the charging proxy section 14 of the network service company. The charging proxy section 14 deducts the service using charge and the predetermined fee per user 5 from the amount of money received and pays the remainder to the SD center 1.

In step S405 shown in FIG. 10, the charging section 17 waits for the payment from the charging proxy section 14 of the network service company 7, and, when paid, processing is transferred to the payment section 19.

The payment section 19 of the SD center 1, as indicated in step S406 of FIG. 10, refers to the contract master 22 and the sales slip file 24. In step S407, a share of the operator of the SD center 1 is subtracted from the amount of proceeds. The sales slips accumulated in the sales slip file 24 are sorted out for each content, and the sales prices recorded on all the sales slips are added up per content. On the other hand, a share rate of the operator of the SD center 1 is read from the record of the payment site registered in the contract master 22. Then, the share of the operator of the SD center 1 is subtracted from the added-up amount of proceeds per content.

In step S408, the payment section 19 refers to the content database 21. That is, the provider data are read per content.

In subsequent step S409, an amount of distribution money is calculated. That is, the proceeds after being subtracted are distributed per ID (ID of a single or a plurality of providers 2, or, IDs of a single or a plurality of providers 2 and of a single or a plurality of other rightful claimants 3) contained in the provider data of the individual contents. In this case, if the provider data contains the data of the shares between the parties 2 and 3, the proceeds are evenly distributed to the respective IDs. If the provider data contain the data of the shares between the respective parties 2 and 3, however, the proceeds are distributed according to this item of data of the shares.

In next step S410, the proceeds distributed in step S409 are paid into the bank accounts of the individual providers 2 and of other rightful claimants 3 in accordance with the respective IDs of the parties 2 and 3. Thereafter, the processing returns to step S401 in the charging section 18 in preparation for the claiming processes in next month.

Figure 11:
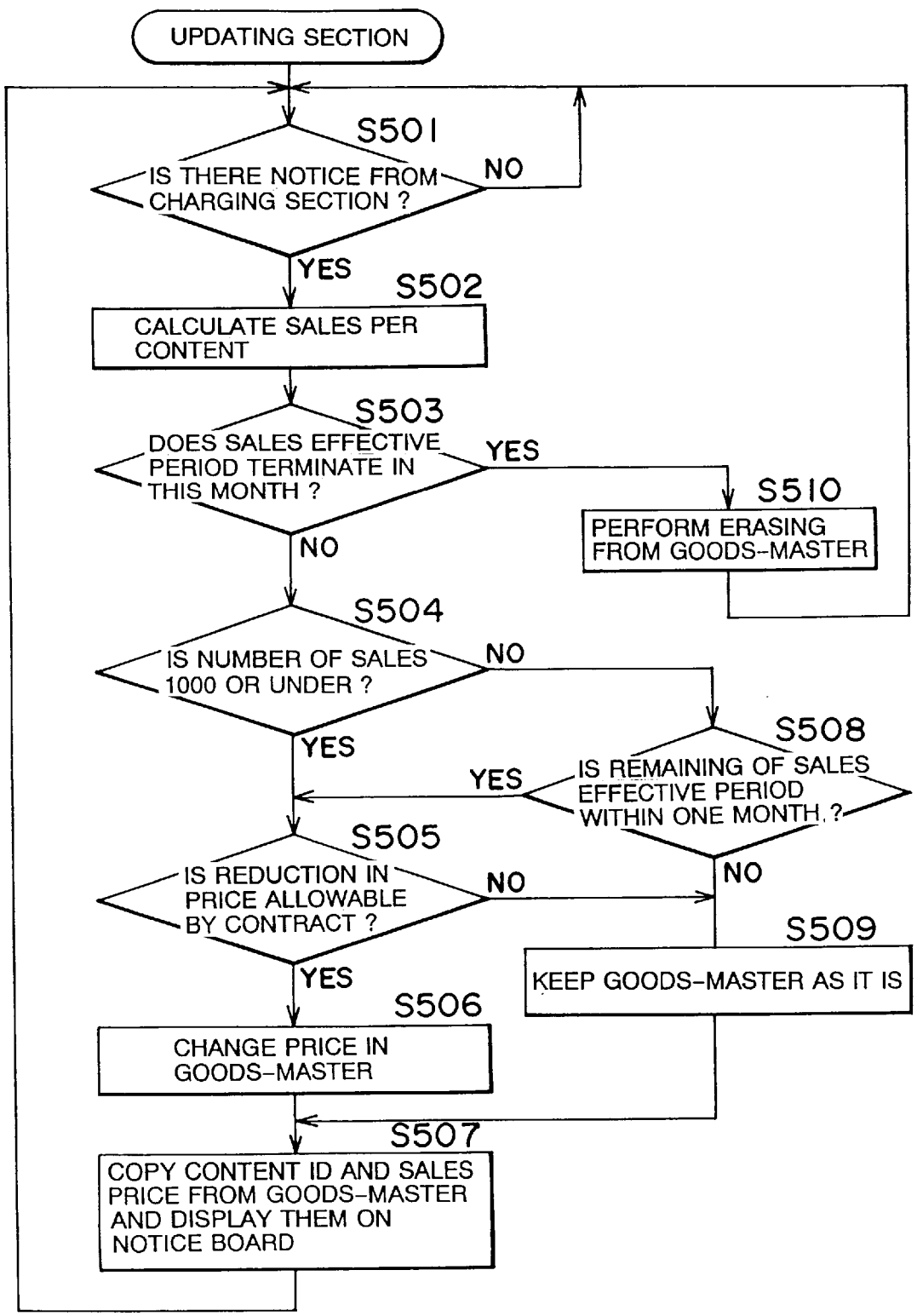
FIG. 11 is a flowchart showing updating processes executed by an updating section shown in FIG. 3.

FIG. 11 shows processes for updating in the goods master 23 that are executed by the updating section 20 of the SD center 1.

In step S501 the updating section 20 awaits a notice of the number of sales slips per content from the charging section 18.

In step S502 executed when the notice of the number of sales slips received, the sales are calculated per content.

In step S503, the updating section 20 checks whether the last day of the sales effective period is within this month with reference to the sales effective period for each content that is registered in the goods master 23. Then, for a content having the last day of the sales effective period within this month, the data about this content are erased from the goods master 23 in step S510.

In contrast with this, for a content having the last day of the sales effective period outside of this month, whether the number of sales in this month is 1000 or less is determined in step S504. Then, for the content having the number of sales numbering 1000 or less, a process in step S505 is executed.

In contrast, with respect to the content the sold number of which exceeds 1000, in step S508 the updating section 20 checks whether the remainder of the sales effective period is within one month by referring again to the sales effective period per content that is registered in the goods master 23. Then, for a content with the remainder of the sale effective period exceeding one month, the goods master 23 remains unchanged (in step S509), and the processing proceeds to step S507. On the contrary, for a content with the remainder of the sale effective period within one month, the process in step S505 is executed.

The details of the contract of each content that are registered in the contract master 22 are examined in step S505, thereby checking whether a reduction of the sales price of a processing target content is permitted. Then, if not permitted, the goods master 23 remains unchanged (in step S509), and the processing proceeds to step S507. If permitted, the sales price of the processing target content that is registered in the goods master 23 is reduced at a fixed rate, and the processing moves forward to step S507.

In step S507, the content IDs and the sales prices of all the contents are copied from the goods master 23 and displayed on the notice board 42 of the key sales section 17. Thereafter, the processing returns to step S501 to wait for a next notice from the charging section 18.

Figure 12:
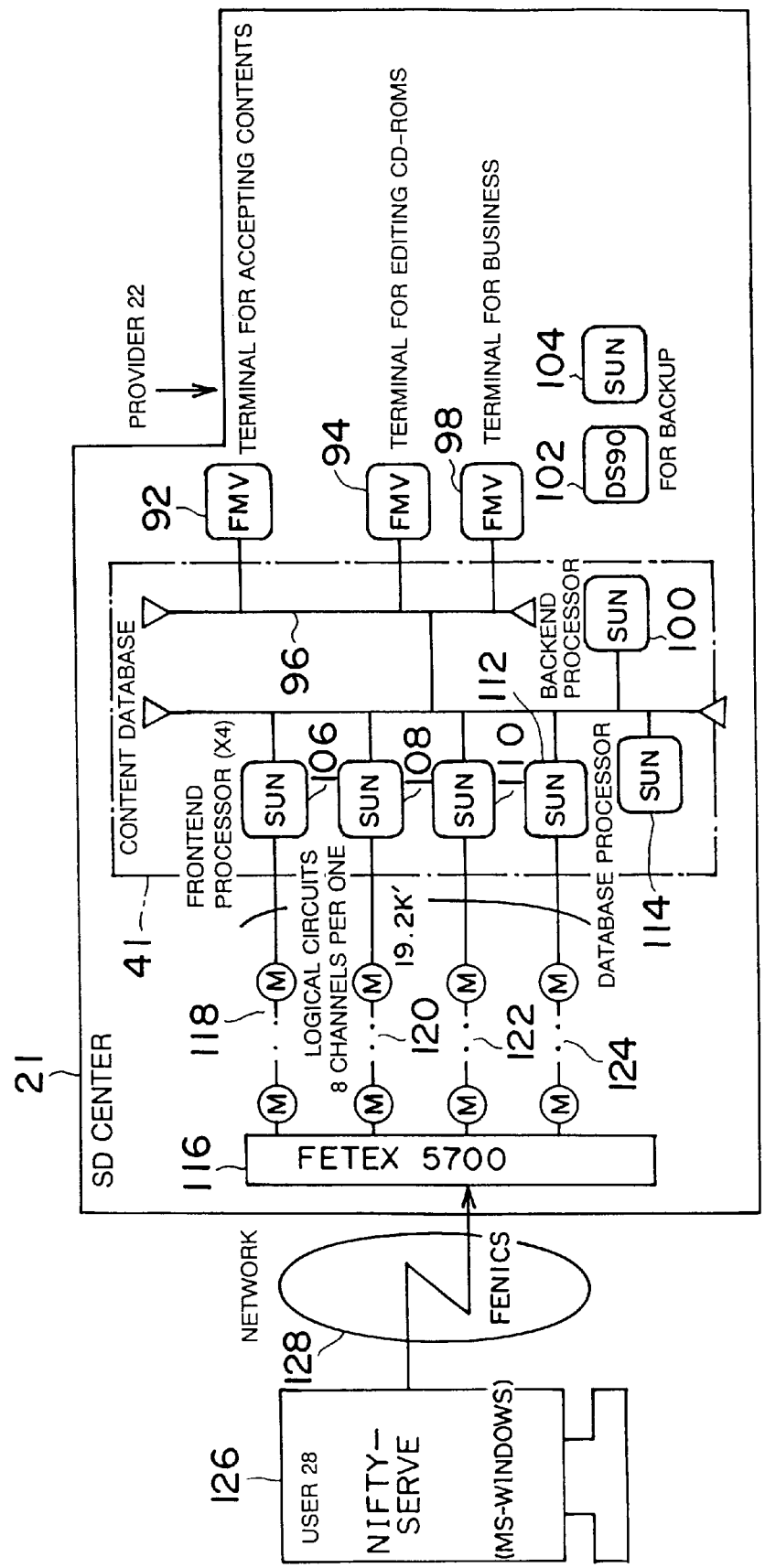
FIG. 12 is a diagram of a hardware configuration of the present invention.

FIG. 12 shows a preferred embodiment of the present invention. As shown in FIG. 12, a provider 22 provides contents to be placed on a CD-ROM to an SD center 21. The contents is accepted by the SD center 21 and stored on a Fujitsu FMV™ Personal Computer 92. The Fujitsu FMV™ Personal Computer 92 is provided as a terminal for accepting the contents, and stores the contents in a content database 41, described in detail herein above with reference to FIG. 3. The CD-ROM editing section 42, also as described in reference to FIG. 3, is implemented on a Fujitsu FMV (tm) Personal Computer 94. The Fujitsu FMV (tm) Personal Computer 94 is coupled to the Fujitsu FMV (tm) Personal Computer 92 by bus 96. Also as shown in FIG. 12, a terminal for business transactions is implemented on a Fujitsu FMV (tm) Personal Computer 98. The Fujitsu FMV (tm) Personal Computer 98 is also coupled to the bus 96 and interfaces through bus 96 with back end processor 100. Back end processor 100 is implemented on a SUN (tm) model of computer and executes the business processes in the SD center 21. Business processes in the SD center 21 include updating masters, managing sales, and monthly and daily batch processing of computer jobs.

A Fujitsu DS90(tm) model of business server computer 102 and a SUN model of computer 104 are provided as backup computers for the SD center 21.

Also coupled to bus 96 are 4 front end processors 106, 108, 110, and 112. Front end processors 106, 108, 110, and 112 are each implemented on SUN 4/20(tm) computers and implement application programs for accepting purchase of contents and interfacing with database processor 114. Database processor 114, in turn, interfaces with memory (not shown in FIG. 12) storing the goods master 46 and contract master 43 databases described with reference to FIG. 3. Front end processors 106, 108, 110, and 112 interface to a Fujitsu FETEX 5700(tm) switching system 116 through 19.2 kilobyte per second lines 118, 120, 122, and 124, respectively. Each of lines 118, 120, 122, and 124 carry 8 channels per line.

The SD center 21 interfaces to a user 28 having a computer running MS-WINDOWS (tm) and connected to a NIFTY-SERVE (tm) network through a FENICS (tm) network 128.

Figure 13:
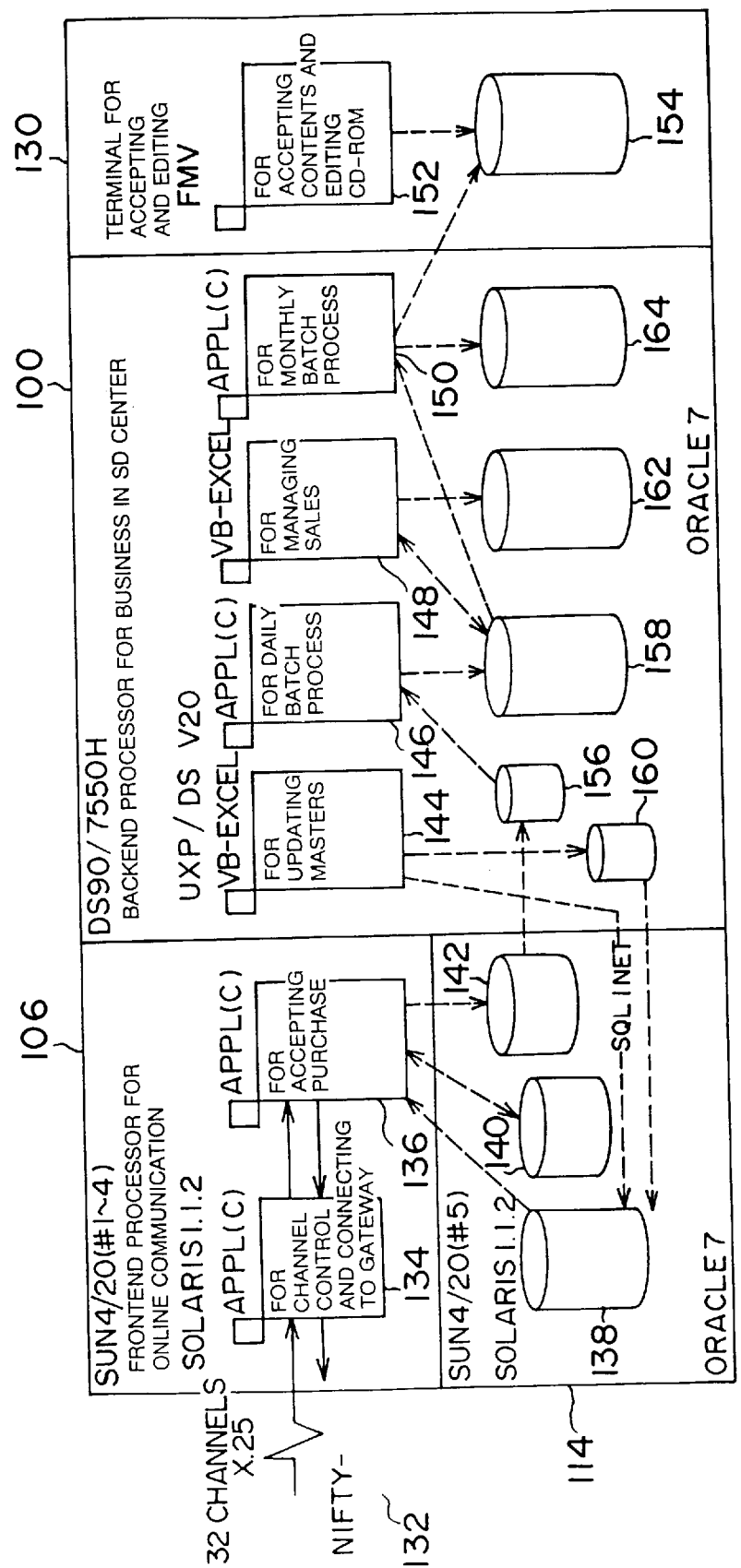
FIG. 13 is a diagram of a hardware configuration of the front end processors and the back end processor shown in FIG. 12.

FIG. 13 shows preferred embodiments of the back end processor 100, any one of front end processors 106, 108, 110, and 112 (with front end processor 106 shown as an example), database processor 114, and Fujitsu FMV (tm) computers 92 and 94 implemented as a terminal of accepting and editing contents 130.

As shown in FIG. 13, front end processor 106 interfaces to NIFTY-GATEWAY 132, which includes 32 channels and is running the X.25 communication protocol. Front end processor 106 is implemented on a SUN 4/20 (tm) computer, running the SOLARIS 1.1.2(tm) operating system. Front end processor 106 is running channel control and gateway connection program 134, which logically interfaces the front end processor 106 to the NIFTY-GATEWAY (tm) 132. Channel control and gateway connection program 134 is coupled to application program 136, also running on the front end processor 106. Application program 136 accepts purchases of contents, and is a preferred embodiment of the key sales section 44 described with reference to FIG. 3. More specifically, application program 136 checks master databases (the goods master, the confidential master and the contract master), issues keys, and confirms purchases.

Also as shown in FIG. 13, database processor 114 is implemented, in a preferred embodiment, on a SUN 4/20 (tm) computer, running the SOLARIS 1.1.2(tm) operating system. The database processor 114 includes database 138, database 140, and database 142, each implemented on separate disk drives. Database 138 stores the goods master 46, a confidential master, and a contract master 46. Database 140 stores a purchase log. Database 142 stores a charging log and an access log. Databases 138, 140, and 142 are ORACLE (tm) 7 databases.

Database 138 can be accessed by SQL-NET (tm) from application program 144 running on back end processor 100. Back end processor 100, in a preferred embodiment, is a Fujitsu DS90/7550H (tm) computer, running the UXP/DS V20(tm) operating system. The back end processor 100 also runs application program 144, application program 146, application program 148, and application program 150. Application program 144 corresponds to the updating section 154 and updates the above-mentioned masters (the goods master 46, a confidential master, and the contract master 43). Application program 146 executes daily batch processes (i.e., accumulating sales, sales per customer, and logs). Application program 148 manages sales (i.e., determines balance, searches sales details, and deals with claims). Application program 150 executes monthly batch processes (i.e., payment, charge, shifting of accumulation, and balancing). The charging section 52 and the payment section 56 disclosed herein above in reference to FIG. 3 are implemented by application program 150. Application programs 144 and 148 are implemented, in a preferred embodiment, with VB-EXCEL (tm).

The terminal for accepting and editing 130 executes application program 152 under the Fujitsu FMV (tm) operating system. Application program 152 executes acceptance of contents and editing of a CD-ROM 31. The terminal for accepting and editing 130 includes database 154. Database 154 corresponds to the contents database 41 shown in FIG. 3.

The sales slip file shown in FIG. 3 is stored among databases 142, 156, and 158 shown in FIG. 13. Databases 156, 158, 160, 162, and 164, all included in back end processor 100, are implemented using ORACLE 7(tm). Various interfaces among the above-described application programs and databases with reference to FIG. 13 are also shown therein.

According to the thus constructed content distribution system, the remainder after a substraction of the share of the operator of the SD center 21 from the money obtained by selling the contents is distributed also to the provider 2 and the parties 3 having some right of charge pertaining to the relevant content. It is therefore possible to eliminate the overhead of redistributing the proceeds to those parties 23 having the right of charge after the provider 22 as a representative has received the payment of the proceeds in bulk. Further, for such contents with the remainder of the sales effective period being one month or less and the number of sales per month being reduced to a fixed quantity or under, the sales prices can be reduced if the reduction is permitted by the terms of the sales contract. As a result, for contents with a limited selling period, as in the case of seasonal goods, and for contents allowed to be sold for a limited time by the SD center 21, the amount of sales within the period may be increased by stimulating the sales with a reduction of the sales price at the end of the sales period. Similarly, with respect to a content with a drop in the number of sales, a rational sales price may be set with the reduction, thereby improving the number of sales and the amount of sales.

As discussed above, according to the content sales price accounting system and the accounting method thereof of the present invention, in the content distribution system for selling the contents by distributing the contents in the encrypted status to the purchasers, and supplying the purchaser desiring to purchase the content with the key for decrypting the encrypted content, the sales prices of the contents can be updated in accordance with the sales period as in the case of selling the contents over the counters at ordinary retail shops.

A wide range of different working modes can be formed based on the present invention without deviating from the spirit and scope of the present invention. The present invention, therefore, is not restricted by its specific working modes except being limited by the appended charges.

The present invention is not limited to the embodiments, described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be restored to, falling within the scope of the invention.

What is claimed is:

1. A content sales price accounting system, comprising:
  a first database that stores a sales price and a sales period corresponding to a content;
  timer means for indicating a present time;
  price updating means for updating the sales price for the content from a first price to a different price when the present time indicated by said timer means falls within a predetermined period within the sales period; and
  accounting means for charging a person the sales price for the content, if the person purchases the content.

2. A content sales price accounting system according to claim 1, wherein said updating means detects a sales volume for the content and updates the sales price based on whether the detected sales volume is less than or equal to a predetermined value.

3. A content sales price accounting system according to claim 1, wherein the different price is less than the first price, whereby when updating the sales price said updating means reduces the sales price.

4. A content sales price accounting system according to claim 1, wherein said updating means changes the sales price at an interval of a fixed period.

5. A content sales price accounting system, comprising:
  a first database that stores a sales price and a sales period corresponding to a content;
  timer means for indicating a present time:
  price updating means for updating the sales price for the content by reducing the sales price from a first price to a different price when the present time indicated by said timer means falls within a predetermined period within the sales period;
  accounting means for charging a person the sales price for the content, if the person purchases the content; and
  a second database that stores an item of reducible-amount-of-money indicating whether the sales price for the content can be reduced,
  and wherein said updating means updates the sales price when the reducible-amount-of-money data stored in said second database indicates that the sales price of the content can be reduced.

6. A content sales price accounting system, comprising:
  a first database that stores a sales price and a sales period corresponding to a content;
  timer means for indicating a present time;
  price updating means for updating the sales price for the content from a first price to a different price when the present time indicated by said timer means falls within a predetermined period within the sales period;
  accounting means for charging a person the sales price for the content, if the person purchases the content;
  wherein said updating means deletes the sales price for the content from said first database when the present time indicated by said timer means corresponds to the last day of the sales period or a later day.

7. A method of content sales price accounting, the method comprising:
  storing in a first database a sales price and a sales period corresponding to a content;
  comparing a present time with the sales period, and changing the sales price when the present time falls within a predetermined period within the sales period; and
  charging a purchaser of the content the changed sales price.

8. A content sales price accounting system, comprising:
  a price update unit, responsive to a timer indicating a present time, that updates a sales price from a first price to a different price when the present time corresponds to a predetermined time period within a sales period, the sales price and the sales period corresponding to a content offered for sale; and
  an accounting unit that charges a purchaser of the content the sales price.

9. A computer-readable medium encoded with a program for content sales price accounting, said program performing:
  updating a sales price from a first price to a different price when the present time corresponds to a predetermined time period within a sales period, the sales price and the sales period corresponding to a content offered for sale; and
  charging a purchaser of the content the sales price.

* * * * *